(12) United States Patent
Kanan

(10) Patent No.: US 7,473,384 B2
(45) Date of Patent: Jan. 6, 2009

(54) METHOD FOR MAKING VINYL COMPOSITION PLANK

(76) Inventor: Antonio Kanan, Canela 238 Col.Granjas, Mexico (MX)

( * ) Notice: Subject to any disclaimer, the term of this patent is extended or adjusted under 35 U.S.C. 154(b) by 463 days.

(21) Appl. No.: 10/752,157

(22) Filed: Jan. 6, 2004

(65) Prior Publication Data

US 2005/0146069 A1 Jul. 7, 2005

(51) Int. Cl.
*B29C 43/24* (2006.01)
*B29C 43/30* (2006.01)

(52) U.S. Cl. .......................... 264/76; 264/160

(58) Field of Classification Search ............ 264/73–76, 264/151, 160
See application file for complete search history.

(56) References Cited

U.S. PATENT DOCUMENTS

| | | | | | |
|---|---|---|---|---|---|
| 2,091,361 | A | * | 8/1937 | Heppes | 264/74 |
| 2,314,062 | A | * | 3/1943 | Alvey et al. | 264/76 |
| 2,625,712 | A | * | 1/1953 | Le | 264/76 |
| 2,775,994 | A | * | 1/1957 | Rowe | 264/74 |
| 2,914,807 | A | * | 12/1959 | Robbins | 264/75 |
| 3,012,285 | A | * | 12/1961 | Marcus et al. | 264/76 |
| 3,020,584 | A | * | 2/1962 | Brakeley | 264/76 |
| 3,060,502 | A | * | 10/1962 | Snyder | 425/363 |
| 3,133,848 | A | * | 5/1964 | Proctor et al. | 264/76 |
| 3,134,829 | A | * | 5/1964 | Brown | 264/76 |
| 3,904,579 | A | | 9/1975 | Braddicks | |
| 3,991,006 | A | | 11/1976 | Chandler | |
| 4,260,534 | A | * | 4/1981 | Hanson et al. | 524/296 |
| 6,794,430 | B2 | * | 9/2004 | Berlemont et al. | 523/351 |

* cited by examiner

*Primary Examiner*—Jill L Heitbrink
(74) *Attorney, Agent, or Firm*—Keeling Patents & Trademarks, LLC; Kenneth A. Keeling

(57) ABSTRACT

A co-polymer tile having a surface comprising elongated grain and stripe patterns simulating a wood grain pattern and a method of manufacturing same are disclosed. The method includes a first mixing step, a grain color addition step, a second mixing step, a compression step, a stripping step, a sheeting step, a calendaring step, a cooling step, and a cutting step.

20 Claims, 5 Drawing Sheets

METHOD FOR MAKING VINYL COMPOSITION PLANK

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention is generally related to co-polymer tiles and more specifically to a tile having a simulated wood-grain appearance and to a method of manufacture of same.

2. Description of the Related Art

Co-polymer tiles are commonly used in commercial, industrial and residential applications. Co-polymer tiles are widely used as floor tiles as they provide a durable floor surface that is easily cleaned. Co-polymer tiles are readily transportable and installed.

Co-polymer tiles are typically formulated using a co-polymer resin, a plasticizer, a stabilizer and a limestone (calcium carbonate) filler. Exemplary descriptions of formulations used to manufacture co-polymer tiles are found in U.S. Pat. No. 3,991,006 issued to Chandler Referring to FIG. 5 (Prior Art), the current practice of manufacture of co-polymer tiles includes the following steps:

Mixing Step: A mixing step 301 including mixing a minor proportion of co-polymer resin and a major proportion of a mineral filler together with a plasticer and a stabilizer. Appropriate resins, filler, plasticizer and stabilizer are commonly known and commercially available in the industry. The mixture is mixed under pressure to obtain uniform color and texture in an appropriate mixer, such as a Banbury mixer manufactured by Farrel Corporation. As is known to those skilled in the art, the Banbury mixer includes rotors and a pressure ram that may be engaged to increase pressure on the mixture during the mixing process. Mixing in the Banbury mixer comprises a batch operation with the mixture released through a gate provided in the mixer upon completion of the mixing process. A coloring agent is added in the mixing stage to obtain a desired color characteristic of the product. Upon mixing, the mixture has a substantially uniform mix and color and is at a temperature of approximately 170° C. (338° F.). Mixing time of a typical batch of co-polymer tile ingredients in a Banbuiy mixer is in a range of one to two minutes.

Compression Step: In a compression step 302, the mixture is then processed between opposed rollers of a roller mill to remove air from the mixture. The exterior surface of each of the rollers is essentially smooth. As the mixture is pulled between the rollers, the mixture tends to adhere to each of the rollers.

Scratching Step: In a scratching step 303, the mixture is then processed between one of the rollers of a roller mill and a scratching roller in a step commonly referred to as scratching. In such process, the exterior surface of a third scratching roller is provided with a plurality of cylindrical pins. The pins of the scratching roller extending outwardly from the exterior surface. The axis of the scratching roller is aligned with one of the rollers of the roller mill. As mixture is rotated between the mill roller and the scratching roller, the plurality of pins of the scratching roller break the mixture into relatively small clumps. The separated clumps fall onto a receiving conveyor.

Sheeting Step: In a sheeting step 304, the clumps of mixture are then processed between rollers of a roller mill. In this step the rollers each have continuous smooth exterior surfaces that form the mixture into an elongated, continuous planar sheet having a relatively smooth top and bottom surfaces and uniform thickness.

Calendering Step: In a calendaring step 305, the sheet of mixture is heated and passed through a plurality of calendaring rollers to reduce the thickness of the sheet to a desired thickness.

Cooling Step: In a cooling step 306, the sheet is then cooled, typically by a water spray.

Surface Treatment Step: In a surface treatment step 307, a surface treatment such as wax, is applied to the top surface of the sheet and the top surface is buffed to provide a suitable sheen.

Stamping Step: In a stamping step 308, the sheet is then cut into a plurality of tiles of desired length and width dimensions, typically by a stamp.

Cuttings remaining after the stamping step 308 may be introduced into the mixing step 301 as the finished product becomes pliable and capable of uniformly mixing with the mixture at the temperature and pressure of the mixing step 301.

Co-polymer tiles are currently manufactured with a variety of patterns. As presently practiced, patterns are introduced into the tiles by adding mottle to the mixture intermediate the scratching step 303 and the sheeting step 304. Mottle comprises chips of co-polymer mixture of a different color from the mixture base color. The mottle chips are engrained in the mixture by pressure and the temperature of the mixture at the sheeting step 304. Such patterns may comprise elongated colored segments of limited length.

It is desirable to create a co-polymer tile having a pattern simulating wood grain as wood floors and floors providing a simulation of wood appearance are desirable. Prior art attempts to create such a wood grain pattern have not been successful.

BRIEF SUMMARY OF THE INVENTION

The objects of the present invention is to provide, inter alia, a co-polymer tile having the physical characteristics of commercially practiced co-polymer tiles, but having the further advantage of providing a simulated wood grain surface appearance.

Other objects of the invention will become evident throughout the reading of this application.

The present invention is a co-polymer tile having a surface appearance simulating a wood grain surface and a method of manufacturing same.

DESCRIPTION OF THE INVENTION

Figure 1:
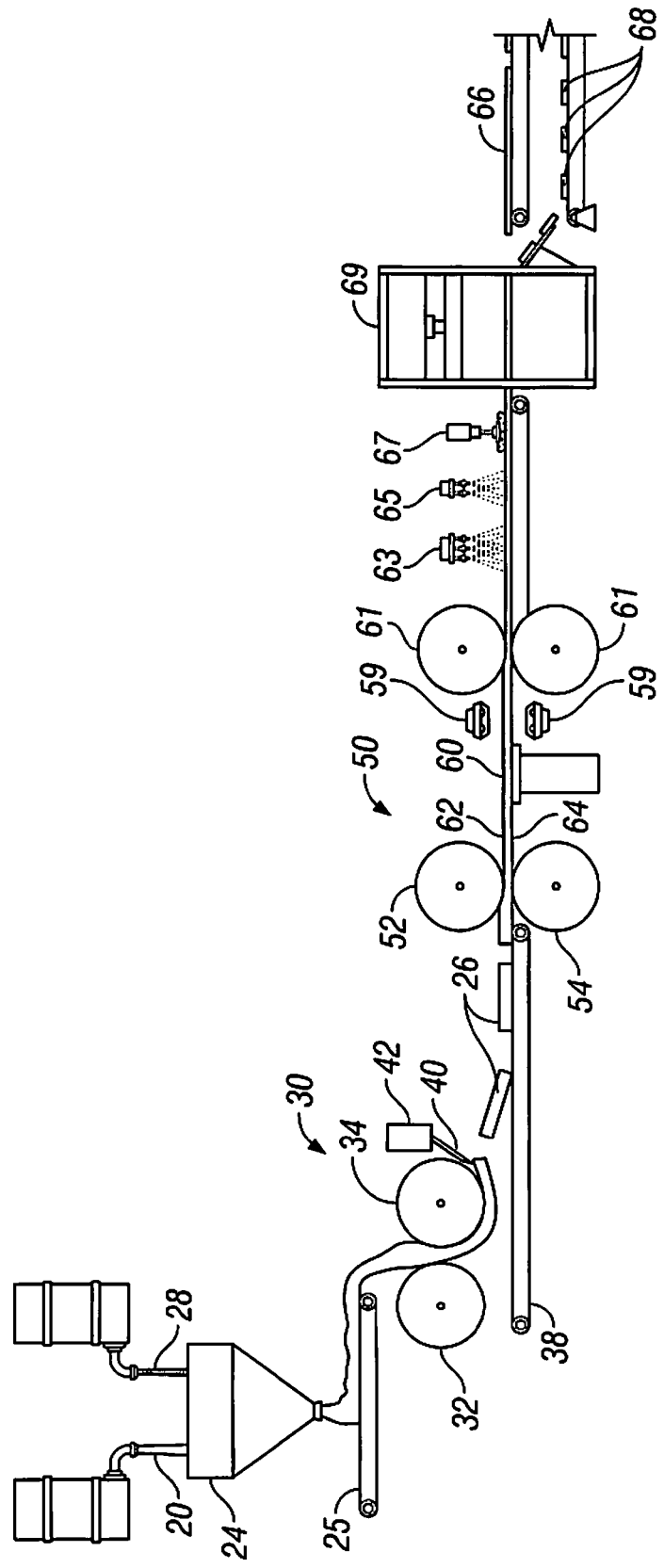
FIG. 1 is a schematic depiction of the process of the present invention.
Figure 4:
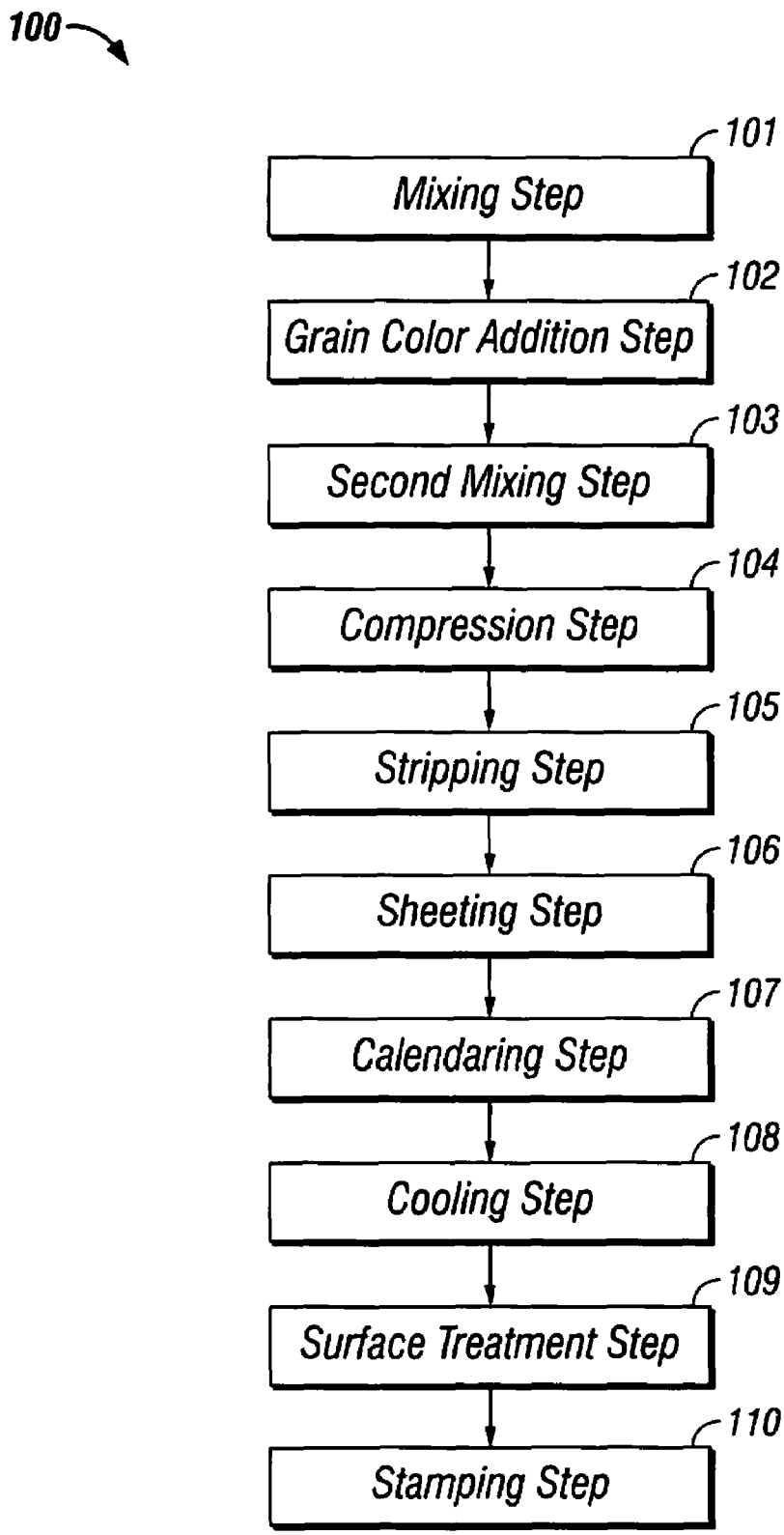
FIG. 4 is a flow chart of the process of the present invention for constructing a co-polymer tile having a surface appearance simulating a wood grain surface.
Figure 5:
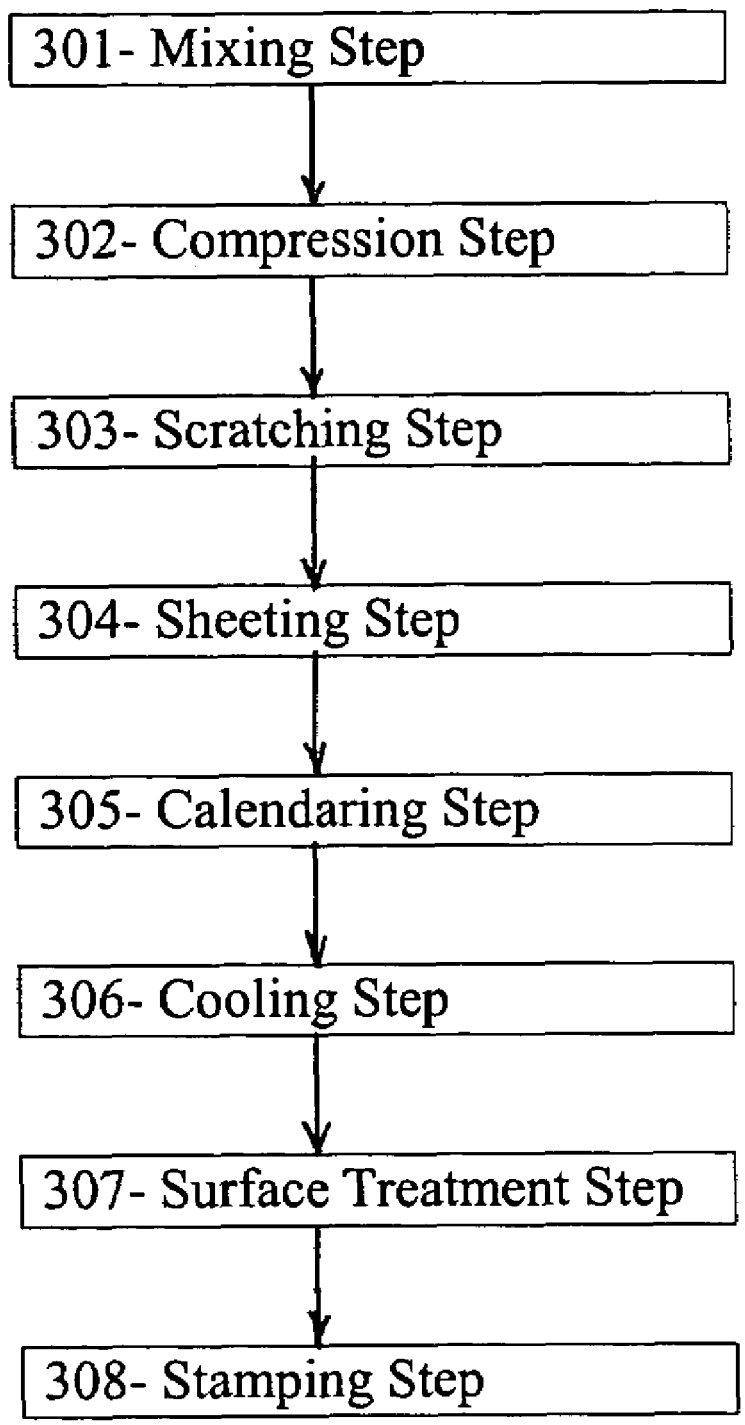
FIG. 5 is a flow chart of a prior art process for constructing a co-polymer tile.

Referring to FIGS. 1 and 4, the process 100 of the present invention for constructing a co-polymer tile 66 having a surface appearance simulating a wood grain surface is depicted.

Mixing Step: A mixing step 101 includes mixing a minor proportion of co-polymer polymer resin and a major proportion of a filler together with plasticizer and a stabilizer. Appropriate resins, filler, plasticizer and stabilizer are commonly known and commercially available in the industry. The mixture 20 is mixed at a desired temperature and pressure to obtain uniform color and texture in an appropriate mixer 24 such as a Banbury mixer.

A base coloring agent (not shown) is added in the mixing stage to obtain a desired base color characteristic of the product mixture 20. The base coloring agent may be in liquid or powder form. The mixture 20 is mixed until a substantially uniform mix and base color is obtained. Mixing time of a typical mixture 20 batch in a typical Banbury mixer 24 is in a range of one to two minutes.

To obtain the simulated wood appearance of the present invention, the base coloring agent used in the preferred embodiment is a shade of brown to obtain a base color that is a shade of brown. It is noted that the base color, after mixing, will be lighter than the coloring agent as the filler is typically a light color. However, the user may elect to use other colors.

Grain Color Addition Step: In the present invention, a Grain Color Addition Step 102 involves addition of grain coloring agent 28 at the end of the Mixing Step 101, but while the mixture 20 batch remains in the mixer 24. In an application of the present invention where a Banbury mixer 24 is used, the pressure ram of the Banbury mixer 24 is deactivated prior to the end of the Mixing Step 101 to allow access from above to the mixture 20 to insert grain coloring agent 28.

Second Mixing Step: Upon introduction of grain coloring agent 28, a Second Mixing Step 103 is conducted for a limited period of time to allow grain coloring agent 28 to be circulated within mixture 20. Step 103 is conducted until grain coloring agent is incorporated into mixture 20 but incompletely mixed. The mixture 20 coloring is therefore non-uniform at the completion of mixing step 103. Mixture time with grain coloring agent is limited to the time needed to allow a pattern of grain color 28' characterized as a striped, ribbon-like pattern to be obtained in the mixture 20. A portion of the striped pattern is curvilinear due to rotary action of the mixer 24.

Grain coloring agent 28 may be the same color as the base coloring agent, a different shade or a different color than the base coloring agent. Even if coloring agent 28 is the same color and shade as the base coloring agent, the coloring agent 28 will be a different color than the mixture 20 as the color of mixture 20 will be affected by mixture of the base coloring agent with the resin, filler, plasticizer and stabilizer. As presently practiced, the filler, which comprises the major proportion of mixture 20, is normally a very light color, resulting in a color of mixture 20 that is lighter than the concentrated base coloring agent. Accordingly, the grain coloring agent 28 will produce a grain coloration effect in the mixture 20 even if grain coloring agent 28 is the same color as the base coloring agent since the other ingredients of the mixture 20 will be mixed with the base coloring agent.

Grain coloring agent 28 may be the same color as coloring agent 22, a different shade or a different color than base coloring agent 22. Even if coloring agent 28 is the same color and shade as coloring agent 22, the coloring agent 28 will be a different color than the mixture 20 as the color of mixture 20 will be affected by mixture of coloring agent 22 with the resin, filler, plasticizer and stabilizer. As presently practiced, the filler, which comprises the major proportion of mixture 20, is normally a very light color, resulting in a color of mixture 20 that is lighter than concentrated coloring agent 22. Accordingly, the grain coloring agent 28 will produce a grain coloring agent 22 since the other ingredients of the mixture 20 will be mixed with the coloring agent 22.

Compression Step: In a Compression Step 104, the mixture 20 is then processed between opposed rollers 32 and 34 of a roller mill 30 to remove air from the mixture 20. As presently practiced, the mixture 20 is transported from mixer 24 to roller mill 30 by a conveyor 25. The exterior surface of each of the rollers 32 and 34 is essentially smooth. As the mixture 20 is pulled between the rollers 32 and 34, the mixture 20 tends to adhere to each of the rollers 32 and 34.

Figure 2A:
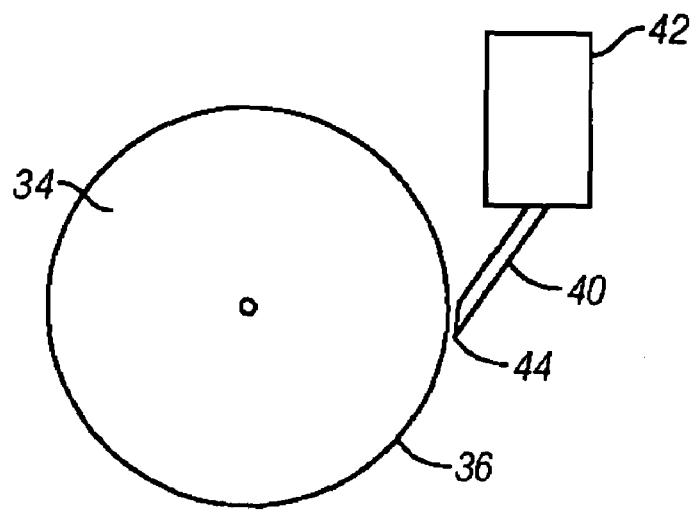
FIG. 2A depicts a view of a separating blade of the present invention.
Figure 2B:
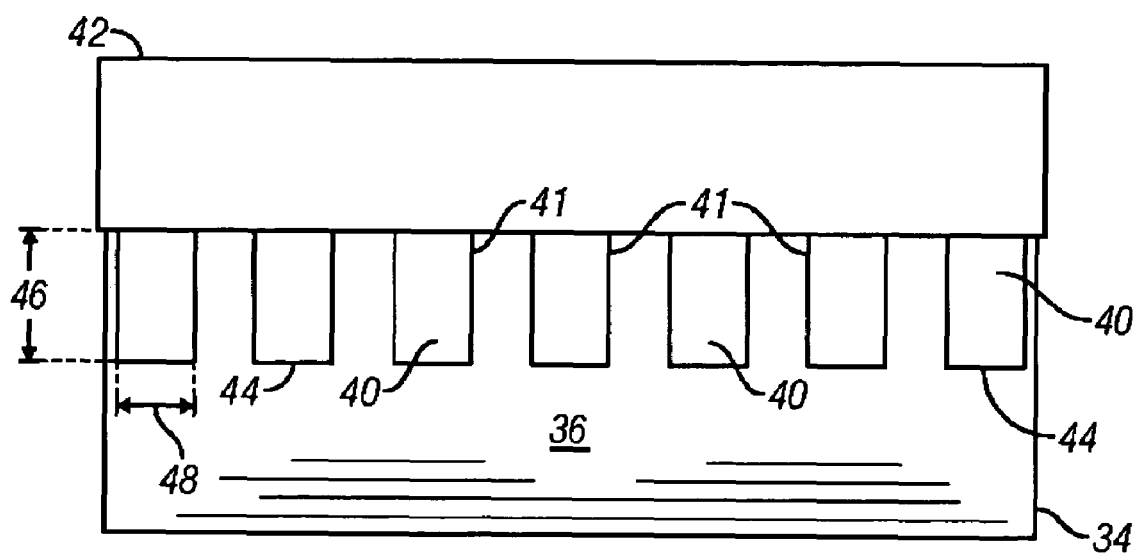
FIG. 2B depicts a series of aligned separating blades of the present invention.
Figure 3A:
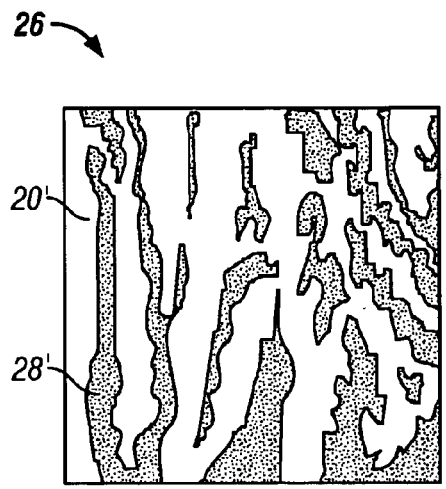
FIG. 3A is a view of a strip segment prior to sheeting.
Figure 3B:
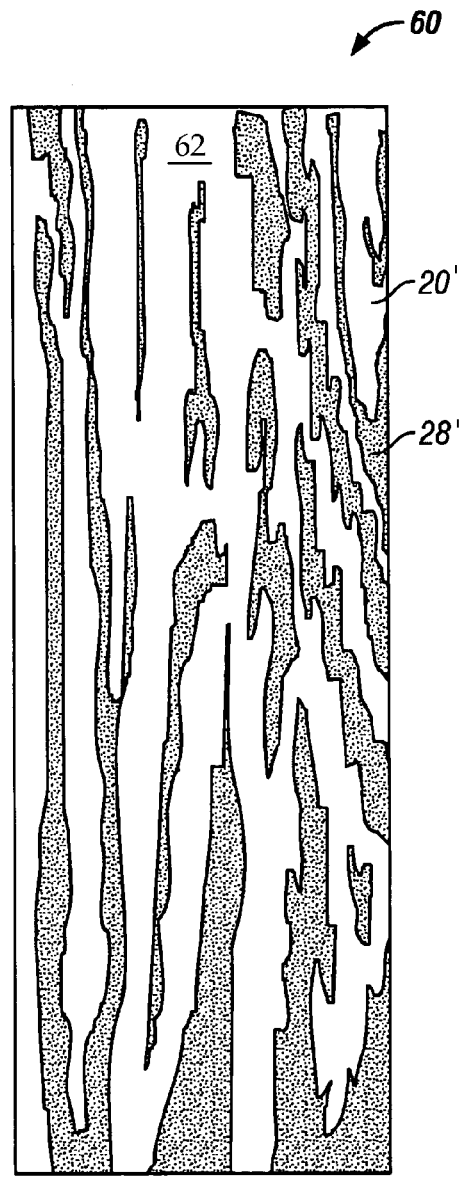
FIG. 3B is a view of a strip segment after sheeting.

Stripping Step: In a Stripping Step 105, the mixture 20 is separated into elongated strip segments 26. Referring to FIGS. 2A and 2B, a method of separating mixture 20 into elongated strip segments 26 includes providing a series of blades 40 to separate mixture 20 from at least one of rollers 32 and 34. In the embodiment depicted, blades 40 are provided to separate mixture 20 from roller 34 and the mixture adhering to roller 32 is circulated for further compression between rollers 32 and 34. In an alternative embodiment, blades 40 may be provided at each of rollers 32 and 34. Blades 40 are held in blade retainer 42. Each of blades 40 is oriented with a blade tip 44 adjacent an exterior roller surface 36 of roller 34. Blade tips 44 are spaced a short distance from roller surface 36 to avoid friction between blade tip 44 and roller surface 36. Openings are provided between each blade 40 and an adjacent blade 40 to allow differential separation of mixture 20 such that strip segments 26 of mixture 20 are removed by each blade 40. In practice, each blade tip 44 will force a segment 26 of mixture 20 to detach from roller surface 36. Rotation of roller 34 pushes additional mixture 20 along blade 40 until the weight of segment 26 causes the segment 26 to fall from the blade 40 onto a conveyor 38 provided to receive the strip segment 26. Each blade 40 has a blade length 46 greater than blade width 48. As mixture 20 is engaged by blade 40, the strip segment 26 tends to separate from mixture 20 at the edges 41 of blade 40. Strip segments 26 accordingly comprise elongated strips of mixture 20. The strip segments 26 comprise a base color 20' with an interspersed grain pattern 28', as seen in FIG. 3A and FIG. 3B. The strip segments 26 contain substantial incidences of a grain color 28' in a striped pattern extending along a portion of the length, or a substantial portion of the length, of the strip segments 26 and substantial instances of a curvilinear pattern of grain color 28' in strip segments 26.

Sheeting Step: Referring to FIGS. 1, 3A and 4, strip segments 26 are transported by conveyor 38 to a roller mill 50. In a Sheeting Step 106, strip segments 26 are compressed between rollers 52 and 54 of roller mill 50. Rollers 52 and 54 each have continuous smooth exterior surfaces that form the strip segments 26 into an elongated, continuous planar sheet 60 having a relatively smooth top surface 62 and bottom surface 64 and uniform thickness. As the strip segments 26 are compressed between rollers 52 and 54 a substantial portion of the strip segments 26 are pulled through in their elongated state and a substantial portion of the strip segments 26 are pulled through in at least a portion of their elongated state. As a result, elongated grain patterns 28' are transmitted to sheet 60 thereby reflecting elongated grain patterns 28' in sheet top surface 62 and bottom surface 64 (not illustrated) as depicted in FIG. 3B. Such elongated grain patterns 28' may include intermediate interruptions and cross grain patterns. With the appropriate base coloring agent and grain coloring agent 28, the pattern simulates a wood grain pattern.

Calendering Step: In a Calendaring Step 107 the sheet 60 of mixture is heated by heaters 59 and passed through a plurality of calendaring rollers 61 to reduce the thickness of the sheet to a desired thickness. Such Calendaring Step 107 is consistent with prior art calendaring steps.

Cooling Step: In a Cooling Step 108, the sheet is then cooled, typically by a water spray 63. Such Cooling Step 108 is consistent with prior art cooling steps.

Surface Treatment Step: In a Surface Treatment Step 109, a surface treatment, such as wax, is applied to the top surface 62 of the sheet 60 and the top surface 62 is buffed and by buffers 67 to provide a suitable sheen. Such Surface Treatment Step 109 is consistent with prior art treatment steps. Surface Treatment Step 109 is not required to produce a tile 66, but is commonly practiced prior to Cutting Step 110 as an effective method of providing a polished surface to tiles 66.

Cutting Step: In a Cutting Step 110, sheet 60 is then cut into a plurality of tiles 66 of desired length and width dimensions. In the preferred embodiment, such cutting is performed by a stamping mechanism such as press 69. While the Cutting Step 110 is consistent with prior art cutting steps, the preferred embodiment of the present invention, the tiles 66 are cut so as to be elongated tiles with the elongated segment of each tile 66 aligned with the elongated grain 28' orientation of the sheet surface 62.

Cuttings 68 remaining after the Cutting Step 110 may be introduced into the Mixing Step 101 as the cuttings 68 becomes pliable and capable of uniformly mixing with the mixture 20 at the temperature and pressure of the Mixing Step 101. Such cuttings 68 are mixed throughout the Mixing Step 101 as the cuttings 68 are not used to create grain color 28'.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents

I claim:

1. A process for constructing a co-polymer tile having a pattern including elongated stripes and curvilinear stripes simulating a wood grain pattern comprising the following steps in order:
    a first mixing step for mixing a co-polymer resin, a filler and a first coloring agent to form a mixture;
    adding a second coloring agent to said mixture;
    a second mixing step for limited mixing of said mixture and said second coloring agent to produce a non-uniform color pattern of said mixture;
    compressing said mixture between a plurality of opposing surfaces;
    stripping a plurality of elongated strips of said mixture from at least one of said plurality of opposing surfaces;
    sheeting said mixture into a continuous planar sheet;
    calendaring said continuous planar sheet to a predetermined thickness;
    cooling said sheet; and
    cutting said sheet into a plurality of tiles.

2. A process according to claim 1, wherein:
    said second mixing step conducted until a stripe pattern of said second coloring agent is obtained in said mixture.

3. A process according to claim 1, wherein:
    said compressing step comprising compressing said mixture between opposed rollers;
    said stripping a plurality of elongated strips of said mixture comprising orienting a plurality of blades such that a tip of each of said plurality of blades is adjacent at least one roller surface; and
    said plurality of blade tips separating strips of mixture from said at least one roller.

4. A process according to claim 2, wherein said first mixing step comprises:
    mixing a minor proportion of said co-polymer resin, a major proportion of said filler, a plasticizer, a stabilizer and said first coloring agent; and
    mixing said resin, filler, plasticizer, stabilizer, and first coloring agent until a uniform mixture having a uniform mixture color is obtained.

5. A process according to claim 1, further comprising:
    treating a surface of said sheet intermediate said cooling step and said cutting step.

6. A process according to claim 1, wherein:
    said second coloring agent is a different color than said first coloring agent.

7. A process according to claim 1, wherein:
    said second coloring agent is the same color as said first coloring agent.

8. A process according to claim 1, wherein said stripping a plurality of elongated strips of said mixture comprises:
    engaging said mixture with a plurality of blades disposed adjacent the opposing surface from which the mixture is being stripped.

9. A process according to claim 1, wherein said sheeting step comprises:
    compressing said plurality of elongated strips into an elongated, continuous sheet.

10. A process according to claim 1, wherein said cutting step comprises:
    cutting said sheet into a plurality of elongated tiles.

11. A process for constructing a co-polymer tile having a pattern including elongated stripes and curvilinear stripes simulating a wood grain pattern comprising the following steps in order:
    a first mixing step of mixing a co-polymer resin, a filler, a first coloring agent to form a uniform color mixture;
    adding a second coloring agent to said uniform color mixture;
    a second mixing step of mixing said uniform color mixture and said second coloring agent to obtain a mixture having a stripe pattern;
    compressing said mixture between a plurality of opposed rollers;
    stripping a plurality of elongated strips of said mixture from at least one of said plurality of opposing rollers;
    sheeting said mixture into a continuous planar sheet;
    calendaring said continuous planar sheet to a predetermined thickness;
    cooling said sheet; and
    cutting said sheet into a plurality of tiles.

12. A process according to claim 11, wherein said stripping step comprises:
    separating a plurality of elongated strips from said mixture on at least one of said plurality of opposing surfaces with a plurality of pre-oriented blades.

13. A process according to claim 12, wherein each of said plurality of pre-oriented blades has a tip proximate said at least one of said plurality of opposing surfaces.

14. A process according to claim 12, wherein:
    each of said plurality of pre-oriented blades has a tip adjacent to said at least one of said plurality of opposing surfaces;

each of said plurality of pre-oriented blades has a blade length and a blade width; and said blade length is greater than said blade width.

15. A process according to claim 12, wherein;

said first coloring agent is a first color;

said uniform color mixture is a second color; and said first color being different from said second color.

16. A process according to claim 12, wherein said sheeting comprises:

compressing said plurality of elongated strips to form a continuous planar sheet having elongated grain patterns therein.

17. A process according to claim 12, wherein said cutting step comprises:

cutting a plurality of elongated tiles of predetermined size from said sheet such that each tile is aligned with said elongated grain patterns;

sorting tiles to remove cuttings from said plurality of elongated tiles; and reintroducing said cuttings to said first mixing step.

18. A process according to claim 12, further comprising:

treating a surface of said sheet intermediate said cooling step and said cutting step.

19. In a process for constructing a co-polymer tile, a method of introducing a wood grain pattern in said tiles comprising the following steps in order:

a first mixing step of mixing a first coloring agent with other tile ingredients to obtain a uniform color mixture;

adding a second coloring agent to said uniform color mixture;

a second mixing step of mixing said uniform color mixture and said second coloring agent to obtain a mixture having a stripe pattern;

separating a plurality of elongated segments of said mixture;

forming said elongated segments into a continuous planar sheet;

calendaring said continuous planar sheet to a predetermined thickness; and cutting said sheet into a plurality of tiles.

20. A process according to claim 19, wherein:

said separating step comprises compressing said mixture between a plurality of opposed rollers and stripping said mixture from at least one of said plurality of opposing surfaces with a plurality of blades, each of said plurality of blades having a blade tip proximate at least one of said opposed rollers.

* * * * *